Figure 1:
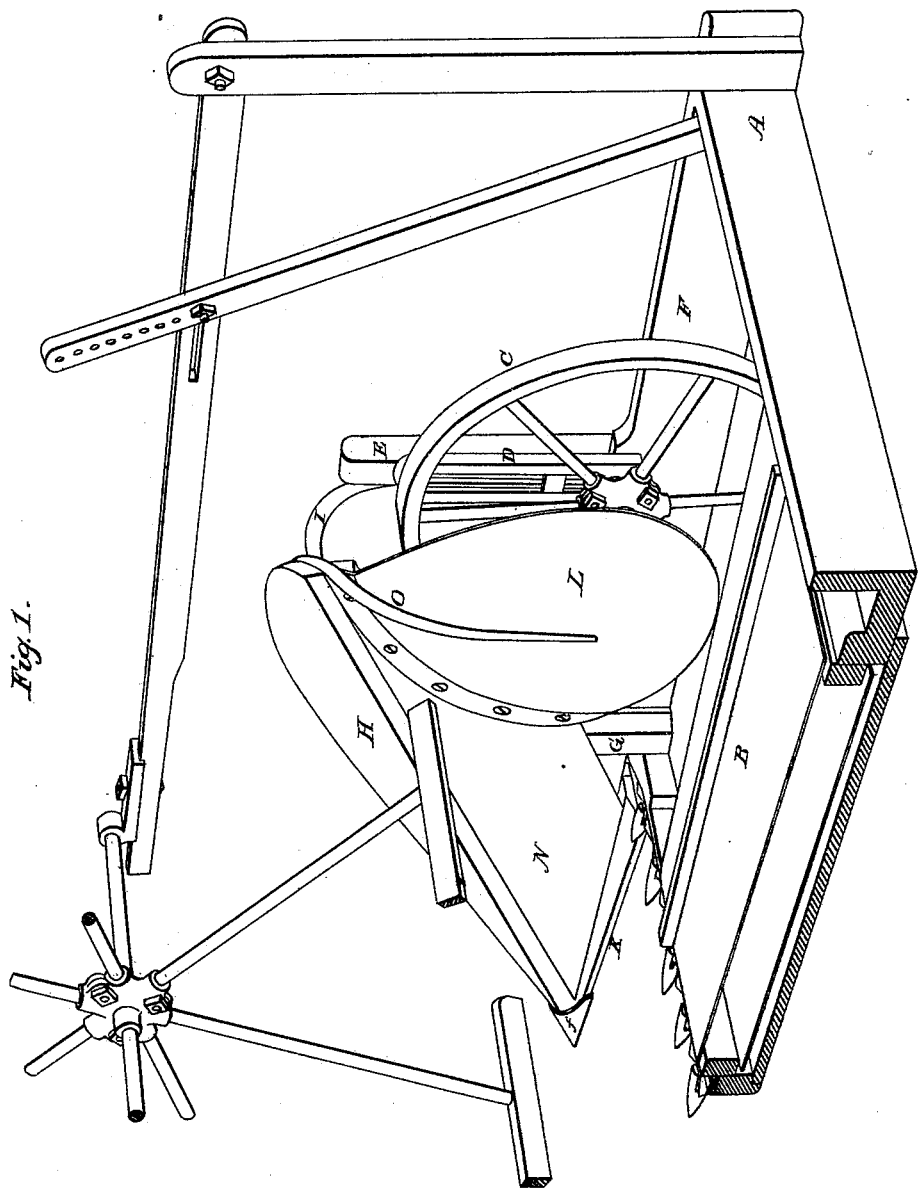

2 Sheets—Sheet 1.

S. D. LOCKE.
DIVIDERS FOR HARVESTERS.

No. 174,964. Patented March 21, 1876.

Witnesses:
C. Clarence Poole
Wm. F. Sliney

Inventor:
S. D. Locke
By his atty
R. O. Smith

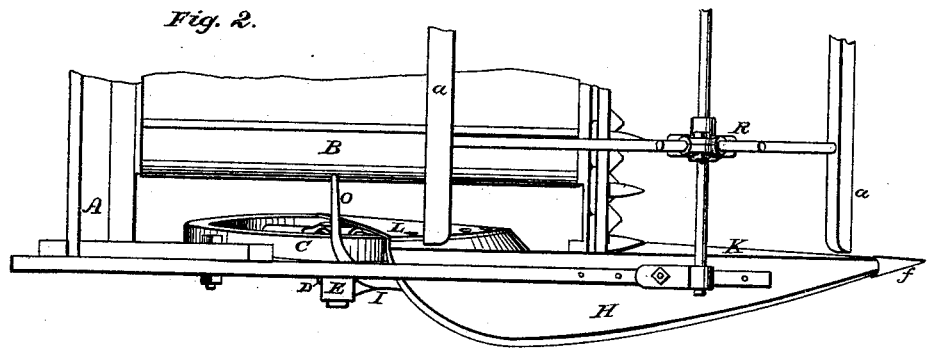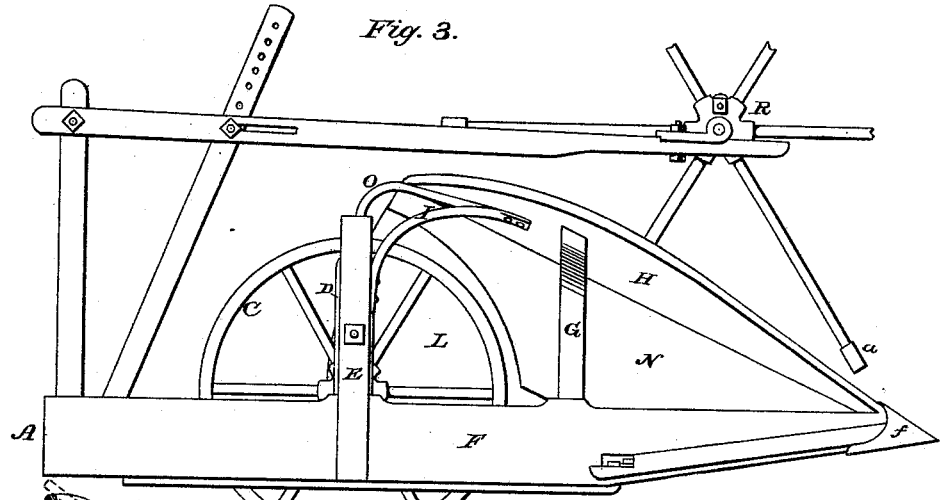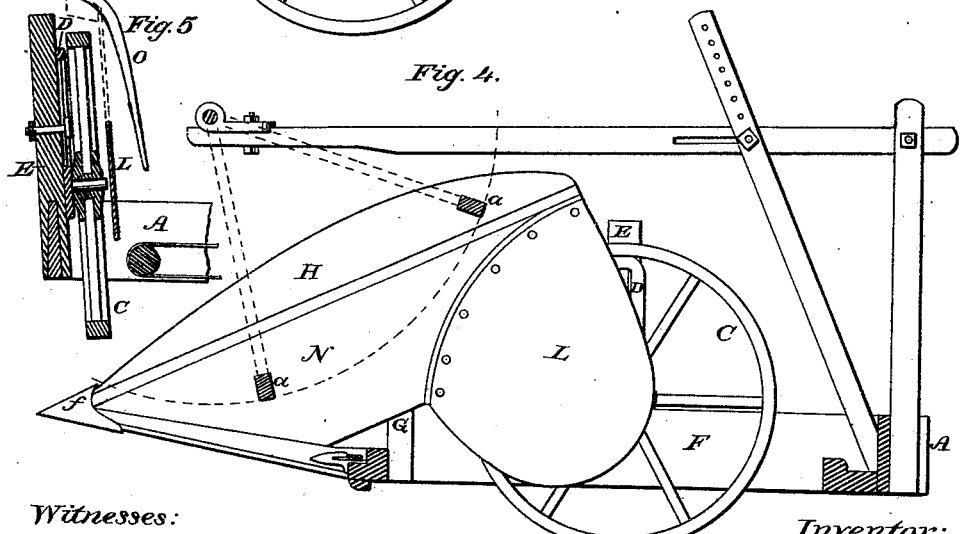

UNITED STATES PATENT OFFICE.

SYLVANUS D. LOCKE, OF HOOSICK FALLS, NEW YORK.

IMPROVEMENT IN DIVIDERS FOR HARVESTERS.

Specification forming part of Letters Patent No. 174,964, dated March 21, 1876; application filed January 26, 1876.

*To all whom it may concern:*

Be it known that I, SYLVANUS D. LOCKE, of Hoosick Falls, Rensselaer county, in the State of New York, have invented a new and useful Improvement in Dividers for Harvesters wherein a side-delivery apron is used; and that the following specification is a full and exact description of the same.

This invention relates to that class of machines popularly known as "harvesters," wherein the cut grain is received upon an endless apron moving laterally across the machine behind the cutting apparatus, and delivering the cut grain at the outer side of the machine. Machines of this class have no rake with a positive movement to seize and carry away the grain from the divider. In fields where the grain is tangled or light and puffy, it will frequently ride up, on, and over the divider and lodge behind it against the reel-post, where it will accumulate until it becomes necessary to stop the machine and clear it away, or until the mass, by its own weight, breaks away. It will then pass across the machine with the apron and clog the elevator, unless prevented by stopping the machine and distributing the grain evenly.

In machines of this class the proper delivery of the grain into the binding-receptacle depends very much upon the manner in which the grain is reeled, and the manner of its fall upon the apron.

The following features are deemed to be very important, if not essential: First, the divider should be sufficiently high to separate, in all ordinary tall and tangled fields, the grain inside from that outside of the divider, before the former is cut; second, the gathering of the divider should be reduced to the minimum, to avoid leaving the grain laterally, and consequently causing it to fall obliquely across the apron, whereby the tendency of the grain to run "tops" first into the binding-receptacle is increased; third, the reel, while extending out to, or near to, the divide-line to reach and sweep in all the grain without unduly topping it, should at the same time sweep inside of the divider, (and not over it,) to be able to reach low enough to gather short or lodged grain; fourth, the grain-wheel must be located inside the divide-line, so as not to run upon the standing grain, and yet present no obstruction to the reel and the falling grain.

Heretofore all of these features have not been combined in a single divider. My invention, therefore, has reference to the outer end of the cutting apparatus of a machine having side-delivery aprons or belts; and consists, first, in extending the outer line or edge of the divider upward, and thence over and downward in a curved line, terminating a short distance above the outer end of the apron or belts, so that the grain, driven up the divider by the advance of the machine, shall be conducted over into the apron, where it joins the stream flowing thereon; second, in a novel arrangement whereby the grain-wheel is mounted on the inside of a divider-girt running nearly at right angles to the cutters forward to the point of the divider, and covering and shielding the same therein by a metallic shield interposed between it and the apron; third, in constructing the divider so that all of its inner face above the apron shall rise vertically in, or quite near to, the divide-line, and the part below shall extend inward to form a gathering-ledge, while the reel can sweep within the former and over the latter, as hereinafter described.

That others may fully understand my improvement, I will more particularly describe it, having reference to the accompanying drawings, wherein—

Figure 1 is a perspective view of my invention. Fig. 2 is a plan of the same. Fig. 3 is an outside elevation. Fig. 4 is an inside elevation, showing how the rod may be dispensed with. Fig. 5 is a transverse section through the grain-wheel.

A is the outer end of the frame of a reaping-machine of the above-named class, and B is the outer portion of the apron thereof. This outer end is supported upon the grain-wheel C, which turns upon a stud projecting from an axle-plate, D, adjustable up and down on the post E, so as to regulate the height of the cutting apparatus from the ground. F is a divider-girt extending quite across the outer end of the machine, and reaching forward so as to form or support the point *f* of the divider. Rising from this girt is a divider bracket or post, G, which supports the rear end of the divider-board H, whose forward end is secured to the forward end of the girt F. I give additional rigidness and strength to the rear end of the board H by securing it to the wheel-post E by means of the tie-brace I. The inside edge of the divider-board is directly over the inside face of the girt F, and in or near the divide-line, and the gathering-ledge K, over which the reel-paddles a play, is secured to the inner face of the girt.

By this arrangement, as all of the divider, or nearly, inside of the divide-line and above the cutters is cut away to give free play to the reel, it will be seen that the latter is capable of the lowest possible adjustment as to altitude necessary in short or lodged grain, and that, as the gather by the divider need only be very slight to bring the grain within the path of the reel, much of the tendency of the grain cut near the divider to fall diagonally upon the apron, and to run "top" forward, consequent upon the heretofore excessive gather, is avoided. The great tendency to choke the sickle in heavy grain by massing upon one (the outer) guard the grain that ought only to be cut by two or more is also avoided.

The grain wheel C is covered and prevented from entanglement with the grain by a thin metallic shield, L, which is secured to a transverse rib or block, M, fastened to the divider-board and girt or to the panel N, which fills the space between said board and girt. This shield L is located so far in the rear of and below the axis of the horizontal reel R that the paddles a of the latter are allowed to sweep in front of it, and nearly or quite to the divide-line.

The divider-board H, as to its outer edge, extends outward and upward, and thence inward over the wheel C, and downward toward the apron, preferably in a continuously curved line, and with the downward part of the curve prolonged to or near to the apron by the rear edge of the shield L, as shown in Fig. 4, or by the rod O, as shown in Figs. 2, 3, and 5.

What I claim as new, and desire to secure by Letters Patent, is—

1. The grain-wheel C, mounted upon an adjustable stud on the inside of the divider-girt, combined with the thin metallic covering-shield L, and side-delivery endless apron or belts B, the shield being attached to the divider, and in continuation of the same, to cover and protect the grain-wheel from the falling grain and conduct the latter upon the apron, substantially as set forth.

2. The divider constructed with that portion of its inner face above the cutters perpendicular to the axis of the reel, and the portion below the cutters forming a gathering-ledge, combined with a horizontal reel and a side-delivery endless apron or belts, so that the beaters of the reel may sweep over the ledge and reach close to the divide-line, as and for the purpose set forth.

3. In combination with the side-delivery endless apron or belts B, for receiving and removing the cut grain, the divider-board H, having its outer edge curved outward and upward, and then over the grain-wheel, and downward toward the apron, to deliver upon the latter the tops of the cut grain, substantially as and for the purpose set forth.

4. In combination with the endless apron for receiving and removing the cut grain, the divider board H and shield L or rod O, when the shield or rod shall form with the outer edge of the board a continuous curve to conduct the grain upon the apron, as and for the purpose described.

5. In combination with a horizontal reel and an endless apron for receiving and removing the cut grain, a divider having its upper inner face coincident, or nearly so, with the divide-line, and its lower inner face a gathering-ledge, while its outer edge shall conduct the cut grain in a continuous curve outward and upward, and then over the grain-wheel and downward upon the apron, substantially as and for the purposes described.

SYLVANUS D. LOCKE.

Witnesses:
EMERSON P. MARKHAM,
MANLY W. MOREY.